Oct. 5, 1937.  S. K. WOOD ET AL  2,095,114
AUTOMOBILE PARKING TIME METER
Filed Aug. 24, 1936  2 Sheets-Sheet 1
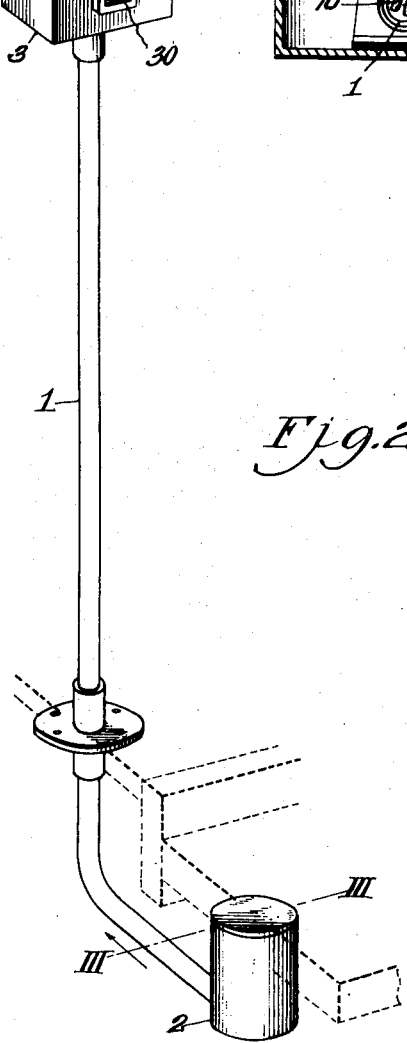
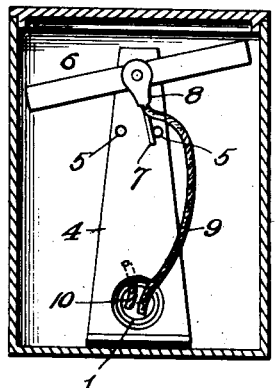
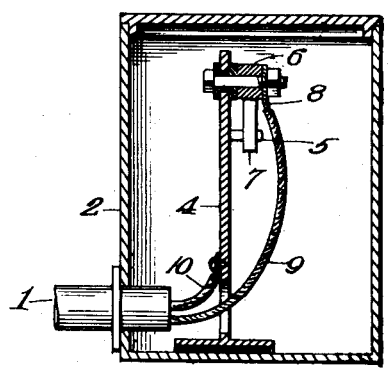
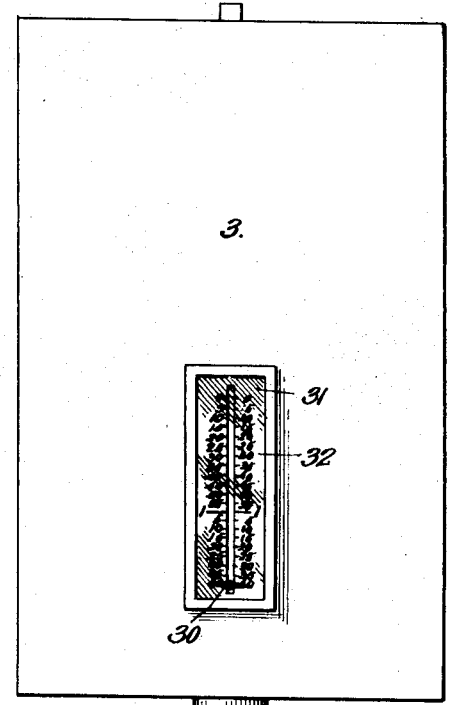
Inventor
*S. K. Wood* & *L. V. DeWitt.*
By *Thorpe & Thorpe*
Attorneys

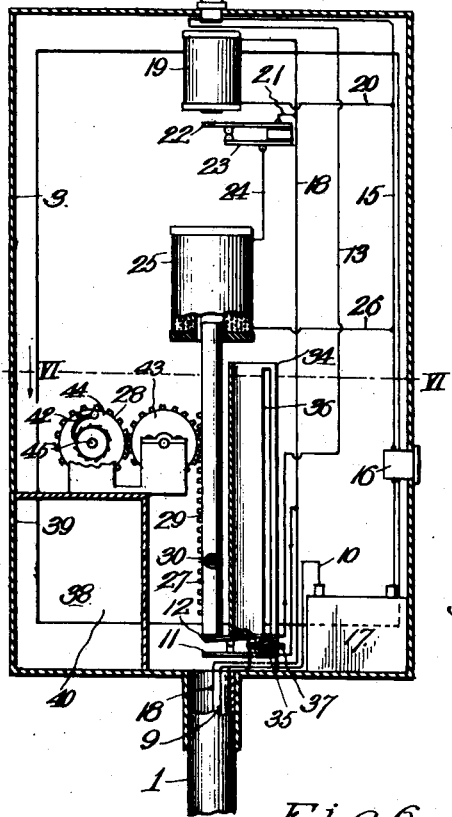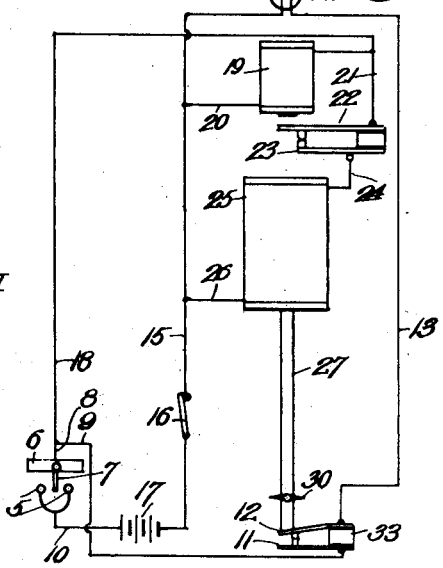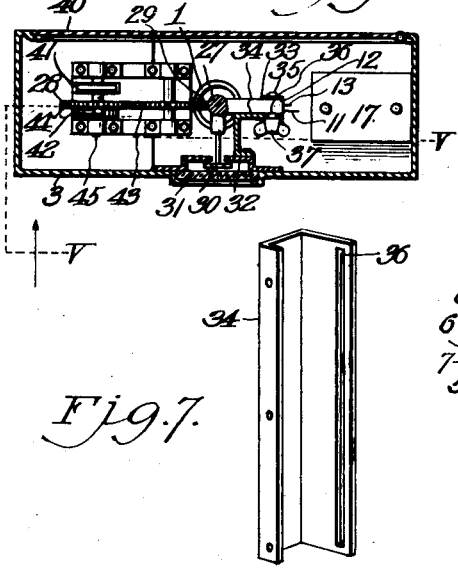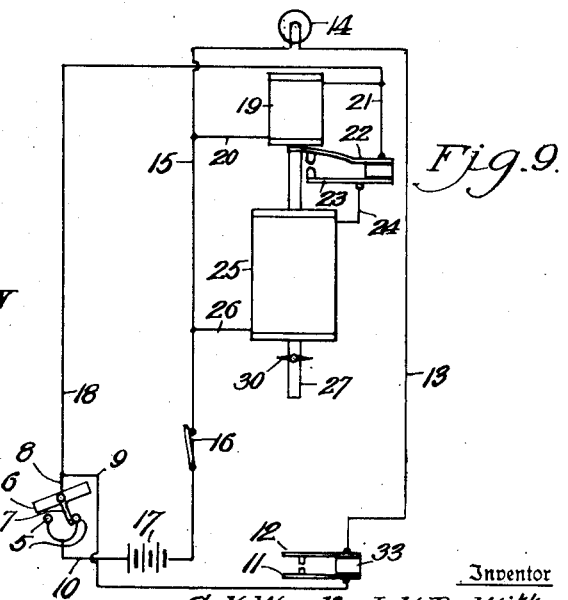

Patented Oct. 5, 1937

2,095,114

UNITED STATES PATENT OFFICE 2,095,114

AUTOMOBILE PARKING TIME METER

Straud K. Wood and Leo V. De Witt, Hutchinson, Kans.

Application August 24, 1936, Serial No. 97,576

3 Claims. (Cl. 161—15)

This invention relates to motor car parking control meters for use particularly in business districts for free parking privileges for specified periods of time, and our object is to produce a meter for automatic operation upon the entrance of a car in a meter-protected zone and which, at the end of the parking time allowed, operates a signal to apprise the motorist, if present, and the traffic officer in charge of that district, of that fact.

A further object is to provide for the automatic restoration of the meter to normal or inoperative condition upon the departure of the car from said zone, and to provide means whereby the traffic officer can reset the device while the car is in position and when it has overstayed the parking period.

A still further object is to provide as part of the meter apparatus, a box or chamber for the reception from the officer, of an overtime charge ticket bearing the meter number and indicia identifying the particular car, the arrangement also enabling the motorist, when he finds a duplicate ticket in his car, to deposit such duplicate and the amount of the fine for overparking in the box, and thus saving his own time by avoiding the necessity of going to the proper traffic bureau to pay the fine.

With the objects mentioned in view, the invention consists in certain new and useful features of construction and organization of parts as hereinafter described and claimed; and in order that it may be fully understood, reference is to be had to the accompanying drawings, in which:—

Figure 1 is a perspective view of a parking meter embodying the invention, parts of a sidewalk, curbing and street paving being indicated in dotted lines.

Figure 2 is an enlarged face view of part of the meter.

Figure 3 is an enlarged vertical section taken on the line III—III of Figure 1.

Figure 4 is a vertical section of the structure disclosed by Figure 3, but taken at right angles to the latter.

Figure 5 is a vertical section on the line V—V of Figure 6.

Figure 6 is a horizontal section on the line VI—VI of Figure 5.

Figure 7 is a detail view of a bracket for the support of certain adjustable electrical conductors.

Figure 8 is a diagrammatic view showing the electric circuit elements when the meter is in normal or inoperative condition, as when no car is in the parking space.

Figure 9 is a diagrammatic view with certain electric circuit elements disposed in the position they occupy when a car occupies the parking space.

In the said drawings, 1 indicates a tubular standard forming part of a parking meter, the meters being adapted to be spaced along a sidewalk near the curbing, at uniform distances apart to readily accommodate large cars, each meter being located near the front end of its parking space or zone, as conventional with street parking meters and hence not indicated on the drawings.

The standard is secured in fixed relation near the curbing, and has a conduit leading outward under the curbing to a magnetic-switch housing 2, a second or signal-display housing 3 surmounting the standard at a convenient height for view as will hereinafter appear.

Within the housing 2 and insulated therefrom, is a bracket 4 having two spaced contact points 5. Pivoted upon and insulated from the bracket is a balanced permanent magnet 6, having a depending contact arm 7 normally standing spaced equal distances from the points 5.

A plate 8 is in contact with magnet 6, and with one end of a conductor 9, and a second conductor 10 leads from the bracket 4 and, with conductor 9, extends through the conduit and standard, into the signal-display housing 3. Conductor 9 leads to a contact plate 11 normally engaged by a spring contact 12, which plates are adapted for conjoint adjustment for a purpose which hereinafter appears. Contact plate 12 is connected by conductor 13 to an incandescent lamp 14 or other signal surmounting the housing 3, said signal being adapted to be made inaccessible by a suitable cage or housing, not shown, to avoid injury or removal. From the signal, the lamp 14, a conductor 15 leads through a normally-closed switch 16, to a battery 17. The switch 16 is shown in conventional form, but in practice, will be of some conventional type inoperable except by a special key (not shown) in charge of a traffic officer. A conductor 18 leads from conductor 9, to an electro-magnet 19, wired as at 20 to conductor 15, and a conductor 21 leads from conductor 18 to a spring contact plate 22, normally engaged with a contact plate 23, wired as at 24 to a solenoid coil or the like 25, which is wired also at 26 to conductor 15.

When the parking space of a particular meter, is vacant, the balanced permanent magnet occupies the position shown in Figure 8, and no circuit exists, it being noted by reference to the last named figure of the drawings, that as the solenoid is normally deenergized, its core 27, is in its depressed position and by its weight, is holding the spring contact plate 12 in engagement with contact plate 11. When a car enters the parking space, part of its metal mass, will overlie the housing 2 and as a result the permanent magnet will tilt according to polarity, and cause its arm 7 to engage the appropriate point 5. This completes a circuit through closed switch 16, to energize the solenoid, the current flowing from the battery through 10, 5, 7, 6, 8, 18, 21, 22, 23, 24, 25, 26 and 15 back to the battery. It also completes a circuit by way of conductors 18 and 20 to energize the electro-magnet, which, however, does not exert sufficient attractive force to move spring-plate 22. The completion of the circuit through the solenoid causes the core 27 to jump upward, and as a result permits contact 12 to withdraw from contact 11, and also breaks the circuit through the solenoid coil by forcing spring contact 22 upwardly away from contact 23, and within the influence of the electromagnet, which latter, while too weak as stated, to raise the contact 22, will hold it against return engagement with contact 11 as long as the coil is energized. The instant the solenoid coil is demagnetized by the breaking of the circuit at 22—23, the core by gravitative force starts downwardly, the speed of descent being regulated by a conventional clockwork mechanism 26 in gear with a rack-bar 29 on the said core. The core carries a pointer 30 visible through a window 31 of the housing 3, and a scale 32 also visible through said window, cooperates with the pointer to indicate the length of time, and divisions thereof, required for the passage of the pointer from the top or zero point of the dial, to the bottom of the latter. As the pointer attains the lowest point on the scale, or any intermediate point thereof determined by the position of adjustable contact plates 11 and 12, the latter is forced by the weight of the core 27 to reengage contact 11 and thus complete a circuit through the lamp or signal, and the latter remains active until the car departs from the zone, or an officer, breaks the circuit through switch 16, and then reestablishes the circuit for a purpose hereinafter mentioned.

As the parking time is variable in different districts it is desirable to adapt the meter for service in all districts. Therefore, the contacts 11 and 12 are made conjointly adjustable toward or from the solenoid. As one means for accomplishing this object, both contacts are mounted on an insulation block 33 fitted against a bracket 34 within the housing 3, the block having a screw bolt 35 extending through a vertical slot 36 in the bracket and engaged by a nut 37, by which the block can be clamped at the desired point to enable the core when the particular time for a particular zone has lapsed, to engage and force contact plate 12 into engagement with plate 11, and thereby reenergize the solenoid and cause it to jump upwardly and function as hereinbefore explained.

Within the housing there is provided a chamber 38 for the reception of parking tickets and cash charges for overtime parking, a slot 39 in the housing giving access to the chamber for the tickets and cash. The housing also has a door 40 controlling an opening provided for access to the chamber 38 and to the mechanism within the housing.

From the foregoing it will be apparent that the balanced permanent magnet constitutes an element of a switch which stands open normally, but which is closed when a car stands in the related parking zone, and completes circuits through the electro-magnet and solenoid coil. The completion of the circuit through the solenoid coil jumps the core thereof upwardly to permit contacts 11 and 12 to separate and to raise contact 22 out of contact with contact 23 and within the supporting force of the electro-magnet. The breaking of the circuit through the solenoid by the separation of contacts 22 and 23 and the upholding of the latter by the electro-magnet, leaves the core free to travel downwardly, such movement being controlled by the clock-work which includes an escapement mechanism indicated at 41, and a pawl and ratchet mechanism 42 which permit the wheels 43 and 44 of the clockwork to turn backward on and without effecting rotation of the shaft 45 upon which the escapement wheel element is mounted.

Assuming that the free parking time is one hour, and that the contacts 11 and 12 have been adjusted on bracket 34 to the appropriate point, it will be apparent that when the pointer 30 registers with the hour mark on the dial, the core has depressed contact 12 against contact 11, and thus completed a circuit through the lamp or signal as long as the circuit through the solenoid remains broken.

When the traffic officer notes the condition mentioned he prepares an overtime ticket, which includes a stub for the officer's record, a duplicate which he deposits in the box, and another duplicate which he places in the car for the owner to secure on his return to the car. He then, with the proper key, operates switch 16, to first break the circuit and then remake it through the battery. This breaks and remakes the circuit through the lamp, but this remaking through the lamp is but momentary, as the solenoid is reenergized and immediately jumps its core upwardly, preliminary to the operations described, so that if the car remains in the parking zone beyond another parking period, a second ticket is deposited in chamber 38 and a second ticket is placed in the car.

From the above description and drawings, it will be apparent that we have produced apparatus possessing all of the features of advantage set forth as desirable, and while we have described what now appears the preferred embodiment, it is to be understood that we reserve the right to make all changes within the spirit of the invention and without the ambit of the prior art.

We claim:—

1. A timing meter comprising a time measuring device having a movable timing element having a limited course of travel, electromotive means for zero-setting such movable element, a control switch in circuit with such electromotive means to energize the same, a second switch in said circuit operated by zero setting of the movable element to break the circuit through the electromotive means, and an electro-magnetic means to hold said second switch in open position during the time of movement of the movable element.

2. A timing meter comprising a time measuring device having a movable timing element having a limited course of travel, electromotive means for zero-setting such movable element, a control switch in circuit with such electromotive means to energize the same, a second switch in said circuit operated by zero setting of the movable element to break the circuit through the electromotive means, electromagnetic means to hold said second switch in open position during the timing movement of the movable element, and a manually operable switch for breaking the circuit through such electromagnetic means to permit reenergization of the electromotive means to effect zero setting of the movable element.

3. A timing meter comprising a time measuring device having a movable timing element which when unrestrained stands at one end of its course of travel, a signal circuit controlled by the timing element, an operating switch, electromotive means energized by closing of the operating switch to zero-set the timing element, an electromagnet also energized by closing of the operating switch, and a second switch controlling the circuit through the electromotive means, the circuit being opened on zero-setting of the movable element and being held open by said electromagnet.

STRAUD K. WOOD.
LEO V. DE WITT.